US009390288B2

(12) United States Patent
Gryb et al.

(10) Patent No.: US 9,390,288 B2
(45) Date of Patent: Jul. 12, 2016

(54) METHOD AND SYSTEM FOR VALIDATING A VIRTUAL ASSET

(71) Applicant: Intuit Inc., Mountain View, CA (US)

(72) Inventors: Oleg Gryb, San Francisco, CA (US); Jinglei Whitehouse, Wayland, MA (US); Elangovan Shanmugam, Cupertino, CA (US); Ankur Jain, III, Redwood City, CA (US); Mark Basler, Milpitas, CA (US); M. Shannon Lietz, San Marcos, CA (US); Sabu Kuruvila Philip, Redwood City, CA (US); Luis Felipe Cabrera, Bellevue, WA (US); Thomas Bishop, San Diego, CA (US)

(73) Assignee: Intuit Inc., Mountain View, CA (US)

(*) Notice: Subject to any disclaimer, the term of this patent is extended or adjusted under 35 U.S.C. 154(b) by 211 days.

(21) Appl. No.: 14/070,050

(22) Filed: Nov. 1, 2013

(65) Prior Publication Data

US 2015/0128295 A1    May 7, 2015

(51) Int. Cl.
*H04L 29/06* (2006.01)
*G06F 21/64* (2013.01)
*G06F 21/44* (2013.01)
*G06F 21/57* (2013.01)

(52) U.S. Cl.
CPC ............... *G06F 21/64* (2013.01); *G06F 21/44* (2013.01); *G06F 21/577* (2013.01)

(58) Field of Classification Search
CPC ........................................................ G06F 21/64
See application file for complete search history.

(56) References Cited

U.S. PATENT DOCUMENTS

| 6,202,066 | B1 | 3/2001 | Barkley et al. |
| 7,228,438 | B2 | 6/2007 | Bushmitch et al. |
| 7,574,746 | B2 | 8/2009 | Hill et al. |
| 7,577,722 | B1 | 8/2009 | Khandekar et al. |
| 7,640,458 | B2 | 12/2009 | Rao et al. |
| 7,779,247 | B2 | 8/2010 | Roegner |

(Continued)

FOREIGN PATENT DOCUMENTS

WO    WO 2013/123548    8/2013

OTHER PUBLICATIONS

Weaver et al., "Method and System for Providing and Dynamically Deploying Hardened Task Specific Virtual Hosts," U.S. Appl. No. 14/070,124, filed Nov. 1, 2013.

(Continued)

*Primary Examiner* — Jeffrey Pwu
*Assistant Examiner* — William Corum, Jr.
(74) *Attorney, Agent, or Firm* — Hawley Troxell Ennis & Hawley LLP; Philip McKay

(57) ABSTRACT

Virtual asset creation data used to create a virtual asset is generated through a virtual asset creation system that includes primary virtual asset data. Secondary authentication data is also generated. When the virtual asset is launched, the secondary authentication data is passed to the virtual asset from the virtual asset creation system. The primary virtual asset data and secondary authentication data from the virtual asset creation system and the virtual asset, and/or one or more other sources associated with the virtual asset, are then sent to a virtual asset validation system through different communication channels. If the primary virtual asset data and secondary authentication data from the two sources match, or have a defined threshold level of similarity, the status of the virtual asset is transformed to the status of validated virtual asset eligible to receive sensitive data.

34 Claims, 3 Drawing Sheets

(56) References Cited

U.S. PATENT DOCUMENTS

| | | | |
|---|---|---|---|
| 7,792,256 | B1 | 9/2010 | Arledge et al. |
| 7,925,923 | B1 | 4/2011 | Hyser et al. |
| 8,132,231 | B2 | 3/2012 | Amies et al. |
| 8,341,625 | B2 | 12/2012 | Ferris et al. |
| 8,347,281 | B2 | 1/2013 | Arsenault et al. |
| 8,639,923 | B2 * | 1/2014 | Lo et al. .................. 713/159 |
| 8,656,482 | B1 * | 2/2014 | Tosa et al. .................. 726/15 |
| 8,799,431 | B2 | 8/2014 | Pabari |
| 2004/0010571 | A1 | 1/2004 | Hutchinson et al. |
| 2005/0108571 | A1 | 5/2005 | Lu et al. |
| 2005/0183138 | A1 | 8/2005 | Phillips et al. |
| 2006/0101519 | A1 | 5/2006 | Lasswell et al. |
| 2006/0248573 | A1 | 11/2006 | Pannu et al. |
| 2007/0043860 | A1 | 2/2007 | Pabari |
| 2007/0101400 | A1 | 5/2007 | Freeman et al. |
| 2007/0169204 | A1 | 7/2007 | Janakiraman et al. |
| 2007/0250424 | A1 | 10/2007 | Kothari |
| 2008/0256639 | A1 | 10/2008 | Onoda et al. |
| 2009/0177717 | A1 * | 7/2009 | Meehan et al. ............ 707/204 |
| 2010/0076987 | A1 | 3/2010 | Schreiner |
| 2010/0235828 | A1 * | 9/2010 | Nishimura et al. ........... 717/174 |
| 2010/0251363 | A1 | 9/2010 | Todorovic |
| 2011/0197065 | A1 | 8/2011 | Stauth et al. |
| 2011/0258692 | A1 | 10/2011 | Morrison et al. |
| 2012/0151553 | A1 | 6/2012 | Burgess et al. |
| 2012/0240193 | A1 | 9/2012 | Littlefield et al. |
| 2012/0266167 | A1 | 10/2012 | Spiers et al. |
| 2012/0291094 | A9 | 11/2012 | Forrester et al. |
| 2012/0304300 | A1 | 11/2012 | LaBumbard |
| 2012/0324446 | A1 * | 12/2012 | Fries et al. .................. 718/1 |
| 2013/0091376 | A1 | 4/2013 | Raspudic et al. |
| 2013/0097701 | A1 | 4/2013 | Moyle et al. |
| 2013/0117567 | A1 | 5/2013 | Chang et al. |
| 2013/0247133 | A1 | 9/2013 | Price et al. |
| 2013/0247207 | A1 | 9/2013 | Hugard et al. |
| 2013/0304693 | A1 | 11/2013 | Jaeger et al. |
| 2013/0326580 | A1 | 12/2013 | Barclay et al. |
| 2014/0047546 | A1 | 2/2014 | Sidagni |
| 2014/0196104 | A1 | 7/2014 | Chari et al. |
| 2014/0282889 | A1 * | 9/2014 | Ishaya et al. .................. 726/4 |

OTHER PUBLICATIONS

Cabrera et al., "Method and System for Dynamically and Automatically Managing Resource Access Permissions," U.S. Appl. No. 14/078,715, filed Nov. 13, 2013.

Cabrera et al., "Method and System for Providing a Robust and Efficient Virtual Asset Vulnerability Management and Verification Service," U.S. Appl. No. 14/186,801, filed Feb. 21, 2014.

Lietz et al., "Method and System for Providing an Efficient Vulnerability Management and Verification Service," U.S. Appl. No. 14/192,529, filed Feb. 27, 2014.

Lietz et al., "Method and System for Providing Temporary Secure Access Enabled Virtual Assets," U.S. Appl. No. 14/217,653, filed Mar. 18, 2014.

Lietz et al., "Method and System for Providing Self-Monitoring, Self-Reporting, and Self-Repairing Virtual Assets in a Cloud Computing Environment," U.S. Appl. No. 14/256,289, filed Apr. 18, 2014.

Cabrera et al., "Method and System for Providing Automated Self-Healing Virtual Assets," U.S. Appl. No. 14/448,326, filed Jul. 31, 2014.

Lietz et al., "Method and System for Correlating Self-Reporting Virtual Asset Data with External Events to Generate an External Event Identification Database," U.S. Appl. No. 14/448,405, filed Jul. 31, 2014.

Schwarzkopf et al., "Increasing Virtual Machine Security in Cloud Environments," *Journal of Cloud Computing: Advances, Systems and Applications*, Jul. 2012, pp. 1-12.

* cited by examiner

METHOD AND SYSTEM FOR VALIDATING A VIRTUAL ASSET

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets, such as virtual machine and server instances in the cloud.

In a cloud computing environment, various virtual assets, such as, but not limited to, virtual machine instances, data stores, and various services, are created, launched, or instantiated, in the cloud for use by an "owner" of the virtual asset, herein also referred to as a user of the virtual asset.

Herein the terms "owner" and "user" of a virtual asset include, but are not limited to, applications, systems, and sub-systems of software and/or hardware, as well as persons or entities associated with an account number, or other identity, through which the virtual asset is purchased, approved managed, used, and/or created.

As noted, the owner of a virtual asset is typically associated with, and identified by, an account number used to create the owned virtual assets. Once the virtual assets are instantiated by the owner of the virtual asset they become available for use by the owner of the virtual asset which then typically authorizes the virtual asset to receive one or more secrets necessary to "boot up" and/or access sensitive data required by the virtual assets to perform the tasks for which the virtual assets were created. Consequently, when launched, the virtual assets are often provided highly sensitive data or secrets by the owner of the virtual asset.

Given the situation described above, it is highly desirable for the owner of virtual assets in a cloud computing environment to firmly establish that the virtual assets they are contemplating using are legitimate virtual assets created by, and owned by, the virtual asset owner. In short, one long-standing security issue associated with cloud computing is the need for owners of virtual assets to validate virtual assets before the virtual assets are provided secrets and sensitive data necessary to boot up, e.g., before any secrets are provided to the virtual assets.

However, a given cloud computing environment can include hundreds, thousands, or even millions, of virtual assets, owned or used by hundreds, thousands, or even millions, of parties. As a result, there is a significant risk that one or more parties with malicious intent will control some of the virtual assets in a cloud computing environment, or use other mechanisms within the cloud computing environment, to obtain access to sensitive secrets and data of other parties/owners. One common method used by these parties with malicious intent is to create malicious virtual assets, or other malicious software, that presents itself as a virtual asset owned by another party. This type of mechanism is known as "spoofing" and is used to lure an owner of virtual assets into believing that the spoofing virtual asset, or other software, is owned by the owner and therefore is eligible to receive secrets and other sensitive data controlled by the owner of virtual assets. Consequently, currently, there is a significant, and legitimate, concern that using cloud computing environments to process sensitive data, such as financial data, is a risky endeavor.

What is needed is a method and system to reliably authenticate that a virtual asset is owned by a given party, e.g., to validate that a virtual asset is a legitimate virtual asset, before providing any secrets, or other forms of sensitive data, to the virtual asset.

SUMMARY

In accordance with one embodiment, a method and system for validating a virtual asset includes generating virtual asset creation data for creating and launching a virtual asset through a virtual asset creation system. In one embodiment, the virtual asset creation data includes primary virtual asset data associated with the virtual asset itself, and/or the operation of the virtual asset, and/or the operating environment of the virtual asset. In one embodiment, secondary authentication data to be transferred to the virtual asset is also generated.

In one embodiment, primary virtual asset data and the secondary authentication data is transferred from the virtual asset creation system to a virtual asset validation system. In one embodiment, the virtual asset of the virtual asset creation data is then launched and the secondary authentication data is transferred to, or passed into, the virtual asset at launch time.

In one embodiment, primary virtual asset data is transferred from the virtual asset, and/or one or more sources associated with the virtual asset, to the virtual asset validation system and the secondary authentication data is transferred from the virtual asset to the virtual asset validation system.

In one embodiment, the primary virtual asset data from the virtual asset creation system and the primary virtual asset data from the virtual asset, and/or one or more sources associated with the virtual asset, are processed and analyzed to determine if the primary virtual asset data from the two sources match, or have a defined threshold level of similarity. In one embodiment, the secondary authentication data from the virtual asset creation system and the secondary authentication data from the virtual asset are also processed and analyzed to determine if the secondary authentication data from the two sources match, or have a defined threshold level of similarity.

In one embodiment, if the primary virtual asset data from the virtual asset creation system and the primary virtual asset data from the virtual asset, and/or one or more sources associated with the virtual asset, match, or have a defined threshold level of similarity, and the secondary authentication data from the virtual asset creation system and the secondary authentication data from the virtual asset match, or have a defined threshold level of similarity, then the status of the virtual asset is transformed to a status of validated virtual asset eligible to receive sensitive data such as secrets required by the virtual asset for boot up.

BRIEF DESCRIPTION OF THE DRAWINGS

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Figure 1:
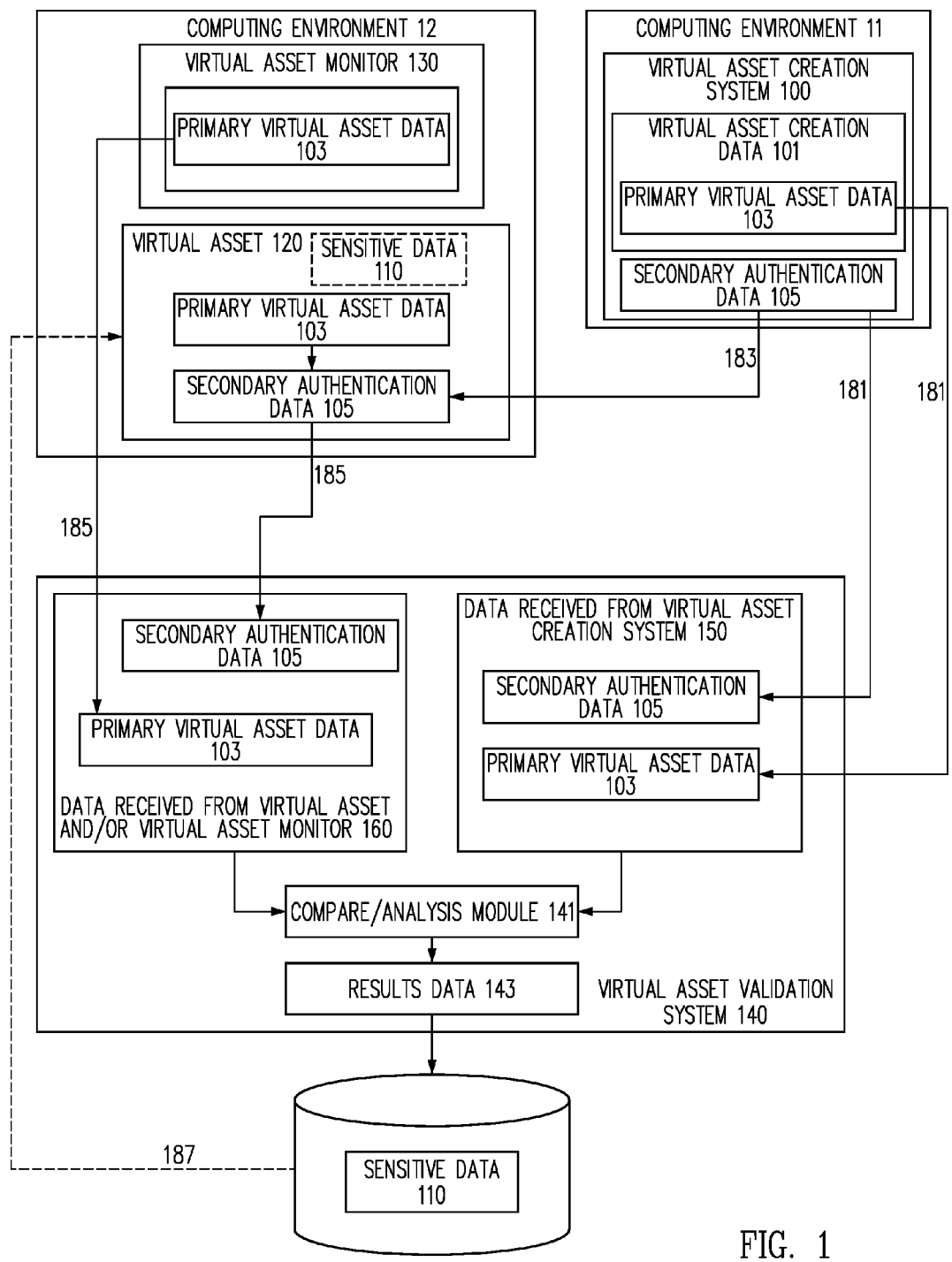
FIG. 1 is a functional block diagram showing the interaction of various elements for implementing one embodiment.

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for validating a virtual asset includes a process for validating a virtual asset implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for validating a virtual asset are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems, and/or two or more computing environments, are connected by one or more communications channels, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the method and system for validating a virtual asset discussed herein. Of particular note, the various elements in FIG. 1 are shown for illustrative purposes as being associated with specific computing environments, such as computing environment 11 and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party and/or entity providing all or a portion of a cloud-based computing environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

In one embodiment, virtual asset creation data used to create a virtual asset is generated.

As used herein, the term "virtual asset" includes any virtualized entity or resource, and/or part of an actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In one embodiment, the virtual asset creation data is generated through a virtual asset creation system such as a virtual asset template through which the creator of a virtual asset can generate operational logic and assign resources and attributes to the virtual asset.

In one embodiment, the virtual asset creation data includes primary virtual asset data associated with the virtual asset itself, and/or the operation of the virtual asset, and/or the operating environment of the virtual asset, such as a cloud computing environment and/or one or more management systems for the cloud computing environment.

As specific illustrative examples, in various embodiments, the primary virtual asset data includes, but is not limited to, one or more of, data indicating the creation time of the virtual asset; data indicating the virtual asset's identification; data indicating the region associated with the virtual asset; data indicating the availability zone associated with the virtual asset; data indicating software modules residing within, or assigned to, the virtual asset; data indicating a number of software modules residing within, or associated with, the virtual asset; data indicating files and/or file names residing within, or assigned to, the virtual asset; data indicating the exact configuration of the virtual asset; data indicating the length of time that it is estimated the virtual asset will take to launch; data indicating the length of time that it historically has taken virtual assets similar to the virtual to launch data indicating a boot sequence for the virtual asset; any data provided by a hypervisor or virtualization layer associated with the virtual asset; any data provided from a cloud control plane associated with the virtual asset; any data provided by any management system associated with the computing environment of the virtual asset; and/or any combination of "inside" virtual asset data as discussed herein, and/or as known in the art at the time of filing, and/or as developed after the time of filing directed to the virtual asset itself, and/or the operation of the virtual asset, and/or the operating environment of the virtual asset.

In one embodiment, using at least part of the virtual asset creation data, a virtual asset is to be instantiated, or launched, in a first computing environment. In one embodiment, as a specific illustrative example, the virtual asset is a virtual machine, or server instance, to be launched in a cloud computing environment.

In one embodiment, secondary authentication data to be transferred to the virtual asset at the time of launch is also generated. In one embodiment, the secondary authentication data is generated through the virtual asset creation system and/or is scheduled to be passed into the virtual asset at launch through the virtual asset creation system.

As noted above, in one embodiment, the primary virtual asset data is data associated with the virtual asset itself, and/or the operation of the virtual asset, and/or the operating environment of the virtual asset. In contrast, in one embodiment, the secondary authentication data is data not strictly connected to the virtual asset itself, the operation of the virtual asset, or the operating environment of the virtual asset, i.e., the secondary authentication data represents information that is from "outside" the virtual asset itself, the operation of the virtual asset, or the operating environment of the virtual asset.

In one embodiment, the secondary authentication data represents additional, or alternative, challenges, and/or responses to challenges, that are used to authenticate the virtual asset and to further identify the virtual asset as a trusted agent for receiving one or more secrets. As discussed below, in one embodiment, the secondary authentication data is used, or provided to, a virtual asset validation system as part of the bootstrap handshake at the time the virtual asset is first launched, but before secrets required for boot up are provided to the virtual asset.

As specific illustrative examples, in various embodiments, the secondary authentication data includes data representing a number, such as a randomly generated number; a group of letters, such as a randomly generated group of letters; a word, such as a randomly generated password; a string of words, such as a randomly generated passphrase or nonsense phrase; data associated with the owner of the virtual asset, such as a serial number, identification key, or operation parameter associated with an application or service, or system that owns the virtual asset; personal data associated with the owner of an account associated with the virtual asset, such physical attributes, e.g., hair color, or hair colors, or eye color, of the owner of an account associated with the virtual asset, or an address, or phone number, or other personal data associated the owner of an account associated with the virtual asset; creation/launch restrictions imposed on the virtual asset such as the time of day when a given class of virtual asset can be launched; any form of token or certificate; and/or any form of secondary authentication data, or factors, as discussed herein, and/or as known in the art at the time of filing, and/or as developed after the time of filing.

Referring to FIG. 1, virtual asset creation system 100 is shown, in this illustrative example, as being implemented, and/or accessed, at least in part, through computing environment 11. As seen in FIG. 1, virtual asset creation system 100 includes virtual asset creation data 101 including primary virtual asset data 103, and secondary authentication data 105.

As noted above, in one embodiment, the virtual asset creation data is generated through a virtual asset creation system such as a virtual asset template through which the creator of a virtual asset can generate operational logic and assign resources and attributes to the virtual asset.

Figure 2:
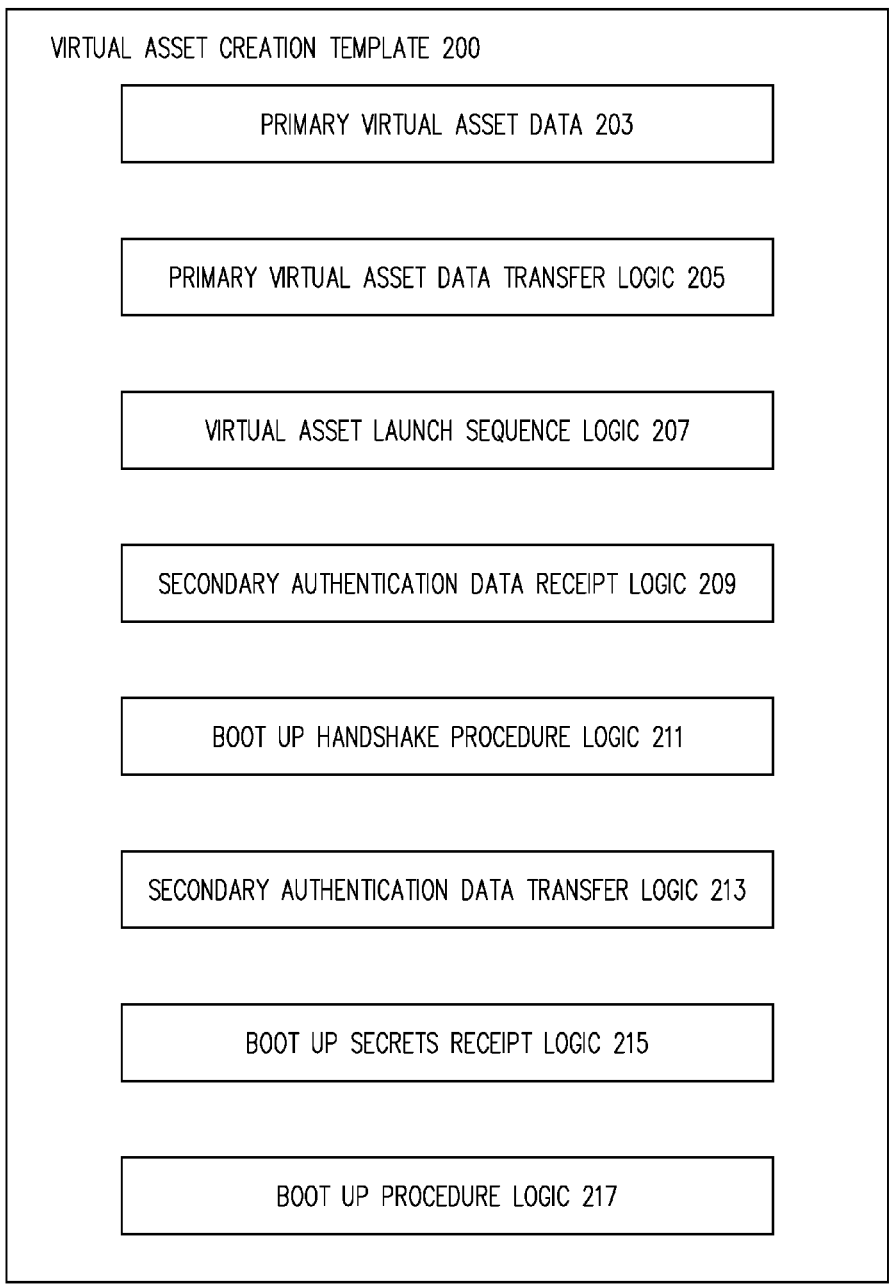
FIG. 2 is a functional diagram of a virtual asset creation template in accordance with one embodiment.

FIG. 2 is a functional diagram of part of the operational logic of a virtual asset creation template 200 for creating a virtual asset, such as virtual asset 120 of FIG. 1, in accordance with one embodiment.

As seen in FIG. 2, in one embodiment, virtual asset creation template 200 includes primary virtual asset data 203 which, as discussed below, in one embodiment, includes at least part of primary virtual asset data associated with the virtual asset itself, and/or the operation of the virtual asset, and/or the operating environment of the virtual asset.

As seen in FIG. 2, in one embodiment, virtual asset creation template 200 includes primary virtual asset data transfer logic 205 which, as discussed below, is used to transfer a copy of at least part of the primary virtual asset data from the virtual asset to a virtual asset validation system.

As seen in FIG. 2, in one embodiment, virtual asset creation template 200 includes virtual asset launch sequence logic 207 for, as discussed below, launching the virtual asset in a given computing environment and indicating the launch sequence and protocols to be used to launch the virtual asset and to be applied at launch.

As seen in FIG. 2, in one embodiment, virtual asset creation template 200 includes secondary authentication data receipt logic 209 for, as discussed below, receiving secondary authentication data that is transferred to, or passed into, the virtual asset at launch time.

As seen in FIG. 2, in one embodiment, virtual asset creation template 200 includes boot up handshake procedure logic 211 for, as discussed below, implementing boot up handshake procedures including, in one embodiment, a procedure for providing secondary authentication data to a virtual asset validation system at the time the virtual asset is first launched, but before secrets required for boot up are provided to the virtual asset.

As seen in FIG. 2, in one embodiment, virtual asset creation template 200 includes secondary authentication data transfer logic 213 for, as discussed below, transferring the secondary authentication data from the virtual asset to the virtual asset validation system.

As seen in FIG. 2, in one embodiment, virtual asset creation template 200 includes boot up secrets receipt logic 215 for, as discussed below, receiving sensitive data such as secrets required by the virtual asset for boot up if primary virtual asset data from the virtual asset creation system and primary virtual asset data from the virtual asset, and/or one or more sources associated with the virtual asset, match, or have a defined threshold level of similarity, and the secondary authentication data from the virtual asset creation system and the secondary authentication data from the virtual asset match, or have a defined threshold level of similarity, and the status of the virtual asset is transformed to a status of validated virtual asset eligible to receive sensitive data.

As seen in FIG. 2, in one embodiment, virtual asset creation template 200 includes boot up procedure logic 217 which uses the sensitive data such as secrets required by the virtual asset for boot up to boot up the virtual asset.

In one embodiment, once the primary virtual asset data and the secondary authentication data are generated, the primary virtual asset data and the secondary authentication data are transferred from, or through, the virtual asset creation system to a virtual asset validation system.

In one embodiment, the primary virtual asset data and the secondary authentication data are transferred to the virtual asset validation system via a first communications channel, such as any communications channel discussed herein, and/or as known in the art at the time of filing, and/or as developed/made available after the time of filing.

In one embodiment, the virtual asset validation system is a module, or subsystem, or a standalone system, implemented, at least in part, in a first computing environment, different from a second computing environment where the virtual asset will be launched. In one embodiment, the virtual asset validation system is implemented, at least in part, in a data center associated with the owner of the virtual asset to be launched. In one embodiment, the virtual asset validation system is implemented in the same computing environment where the virtual asset creation system is located, and/or the virtual asset creation data is entered.

In another embodiment, the virtual asset validation system is a module, or subsystem, or a standalone system, implemented, at least in part, in the second computing environment where the virtual asset will be launched.

In one embodiment, the primary virtual asset data and the secondary authentication data are received by the virtual asset validation system where they are stored for comparison with primary virtual asset data and the secondary authentication data to be received from other sources by the virtual asset validation system, through other communication channels, as discussed below. In one embodiment, to this end, a hash of the primary virtual asset data and the secondary authentication data is performed and the hash value is recorded for later use.

Referring to FIG. 1, virtual asset validation system 140 includes data received from virtual asset creation system 150 that includes primary virtual asset data 103 and secondary authentication data 105 as received from virtual asset creation system 100 via first communications channel 181.

In one embodiment, the virtual asset of the virtual asset creation data is then launched. In one embodiment, at the time the virtual asset is launched, the secondary authentication data is transferred, or passed into, the virtual asset. In one embodiment the secondary authentication data is passed into the virtual asset through a second communication channel, different from the first communication channel, such as any communication channel discussed herein, and/or as known in the art at the time of filing, and/or as developed/made available after the time of filing.

In one embodiment, the secondary authentication data is passed into the virtual asset at the time of launch of the virtual asset, but before the virtual asset receives secrets data representing the one or more secrets, such as encryption keys, or other preliminary boot data required by the virtual asset in order to boot up for operation in its intended role.

Referring to FIG. 1, virtual asset 120 is shown as being launched, or instantiated, in computing environment 12. As also seen in FIG. 1, secondary authentication data 105 is shown as having been transferred, or passed into, virtual asset 120 from virtual asset creation system 100 via second communications channel 183.

In one embodiment, at least part of the primary virtual asset data is transferred to the virtual asset validation system from the virtual asset itself.

In one embodiment, at least part of the primary virtual asset data is transferred to the virtual asset validation system from one or more sources associated with the virtual asset, such as a virtual asset monitor; a hypervisor or virtualization layer associated with the virtual asset; a cloud control plane associated with the virtual asset; any management system associated with the computing environment of the virtual asset; any source associated with the virtual asset capable of providing data indicating the creation time of the virtual asset; any source associated with the virtual asset capable of providing data indicating the virtual asset's identification; any source associated with the virtual asset capable of providing data indicating the region associated with the virtual asset; any source associated with the virtual asset capable of providing data indicating the availability zone associated with the virtual asset; any source associated with the virtual asset capable of providing data indicating software modules residing within, or assigned to, the virtual asset; any source associated with the virtual asset capable of providing data indicating a number of software modules residing within, or associated with, the virtual asset; any source associated with the virtual asset capable of providing data indicating files and/or file names residing within, or assigned to, the virtual asset; any source associated with the virtual asset capable of providing data indicating the exact configuration of the virtual asset; any source associated with the virtual asset capable of providing data indicating a boot sequence for the virtual asset; any source associated with the virtual asset capable of providing data indicating the length of time that it is estimated the virtual asset will take to launch; any source associated with the virtual asset capable of providing data indicating the length of time that it historically has taken virtual assets similar to the virtual to launch; any source associated with the virtual asset capable of providing data indicating a boot sequence for the virtual asset; and/or any combination of sources of primary virtual asset data as discussed herein, and/or as known in the art at the time of filing, and/or as developed after the time of filing.

In one embodiment, the primary virtual asset data is transferred to the virtual asset validation system via a third communications channel that, in one embodiment, is distinct from first communication channel and second communication channel, and is any communications channel as discussed herein, and/or as known in the art at the time of filing, and/or as developed/made available after the time of filing.

In one embodiment, the secondary authentication data is transferred to the virtual asset validation system from the virtual asset. In one embodiment, the secondary authentication data is transferred to the virtual asset validation system via the third communications channel.

Referring to FIG. 1, primary virtual asset data 103 is shown as having been transferred from virtual asset monitor 130 and/or virtual asset 120 to data received from virtual asset and/or virtual asset monitor 160 of virtual asset validation system 140 via third communication channel 185. In addition as shown in FIG. 1, secondary authentication data 105 is shown as also having been transferred to data received from virtual asset and/or virtual asset monitor 160 of virtual asset validation system 140 from virtual asset 120 via third communication channel 185.

In one embodiment, at the virtual asset validation system, the primary virtual asset data from the virtual asset creation system and the primary virtual asset data from the virtual asset, and/or one or more sources associated with the virtual asset, are processed and analyzed to determine if the primary virtual asset data from the virtual asset creation system and the primary virtual asset data from the virtual asset, and/or one or more sources associated with the virtual asset, match, or have a defined threshold level of similarity, in accordance with one or more similarity analysis algorithms, including, in one embodiment, one or more weighted similarity analysis algorithms.

In one embodiment, at the virtual asset validation system, the secondary authentication data from the virtual asset creation system and the secondary authentication data from the virtual asset are also processed and analyzed to determine if the secondary authentication data from the virtual asset creation system and the secondary authentication data from the virtual asset match, or have a defined threshold level of similarity, in accordance with one or more similarity analysis algorithms, including, in one embodiment, one or more weighted similarity analysis algorithms.

In one embodiment, the defined threshold level of similarity is open-endedly defined such that the threshold level of similarity can be adjusted according the sensitivity of the data being transferred and/or the environment into which the sensitive data is being transferred, and/or the type of virtual asset to which the sensitive data is being transferred.

In one embodiment, the one or more similarity analysis algorithms take into account the number and types of primary virtual asset data being analyzed and the type of secondary authentication data being analyzed. In one embodiment, the one or more similarity analysis algorithms apply weighting factors to the types of primary virtual asset data being analyzed and the type of secondary authentication data being analyzed in accordance with pre-determined policies.

In one embodiment, the processing and analyzing of the primary virtual asset data from the virtual asset creation system and the primary virtual asset data from the virtual asset, and/or one or more sources associated with the virtual asset, and the processing and analyzing of the secondary authentication data from the virtual asset creation system and the secondary authentication data from the virtual asset, is performed by hashing the primary virtual asset data and the secondary authentication data from the virtual asset creation system to generate a first hash value. Then, in one embodiment, the primary virtual asset data from the virtual asset, and/or one or more sources associated with the virtual asset, and the secondary authentication data from the virtual asset are also hashed to generate a second hash value. Then, in one embodiment, the first hash value and the second hash value are compared to determine if the first hash value and the second hash value match, or have a defined threshold level of similarity.

Referring to FIG. 1, in virtual asset validation system 140, data received from the virtual asset and or virtual asset monitor 160, including primary virtual asset data 103 received from virtual asset monitor 130 and/or virtual asset 120, and secondary authentication data 105 received from virtual asset 120 is used as input data to compare/analysis module 141. Likewise, data received from virtual asset creation system 150, including primary virtual asset data 103, received from virtual asset creation system 100 and secondary virtual asset data 105, received from virtual asset creation system 100 is provided as input to compare/analysis module 141. As seen in FIG. 1, results data 143 is then generated by compare/analysis module 141.

In one embodiment, if the primary virtual asset data from the virtual asset creation system and the primary virtual asset data from the virtual asset, and/or one or more sources associated with the virtual asset, match, or have a defined threshold level of similarity, and the secondary authentication data from the virtual asset creation system and the secondary authentication data from the virtual asset match, or have a defined threshold level of similarity, then the status of the virtual asset is transformed to a status of validated virtual asset.

In one embodiment, once the status of the virtual asset is transformed to the status of a validated virtual asset, the virtual asset is determined to be eligible to receive sensitive data, including data representing one or more secrets required by the virtual asset to boot up and to begin to perform the functions for which the virtual asset was created.

As used herein, the term "secrets" includes any information, credentials, or other devices, necessary to access one or more resources and/or computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data, and that are required for such access, as discussed herein, and/or as known/available in the art at the time of filing, and/or as developed/made available after the time of filing.

Consequently, in one embodiment, the virtual asset is validated using at least two sources of validation data, including secondary authentication data representing information and data from outside the virtual asset, the operation of the virtual asset, and/or the operating environment of the virtual asset, before any secrets are passed to the virtual asset. As a result, the ability of a malicious party to falsely identify itself, or "spoof", the owner of a virtual asset into providing sensitive data to the malicious party is significantly, if not completely, removed.

Referring to FIG. 1, if results data 143 from compare/analysis module 141 indicates that the primary virtual asset data 103 from the virtual asset creation system 100 and the primary virtual asset data 103 from the virtual asset 120, and/or one or more sources associated with the virtual asset, such as virtual asset monitor 130, match, or have a defined threshold level of similarity, and the secondary authentication data 105 from the virtual asset creation system 100 and the secondary authentication data from the virtual asset 120 match, or have a defined threshold level of similarity, then the status of the virtual asset 120 is transformed to a status of validated virtual asset. As seen in FIG. 1, once the status of the virtual asset 120 is transformed to the status of validated virtual asset, sensitive data 110 is provided to virtual asset 120 via communications channel 187. As noted above, in one embodiment sensitive data 110 includes one or more secrets required by virtual asset 120 in order to boot up and begin to perform the function assigned to virtual asset 120.

Using the method and system for validating a virtual asset discussed above, when a virtual asset is launched, the virtual asset is validated using both "inside" information and data associated with the virtual asset, the operation of the virtual asset, and/or the operational environment of the virtual asset, as well as "outside" information having no direct relation to the virtual asset itself, the operation of the virtual asset, and/or the operational environment of the virtual asset, and as known only to the owner of the virtual asset.

Consequently, using the method and system for validating a virtual asset discussed above, the identity of the virtual asset as a legitimate virtual asset owned and created by the owner of the virtual asset is reliably established before any sensitive data is transferred to the virtual asset, including data representing secrets required by the virtual asset to actually boot up and perform the function assigned to it by the owner of the virtual asset. Consequently, using the method and system for validating a virtual asset discussed above, there is virtually no opportunity for a malicious party to "spoof" the owner of virtual assets into believing a malicious virtual asset, or other software, associated with the malicious party is a virtual asset owned by the owner of virtual assets. As a result, there is little chance that sensitive data or secrets will be passed to an imposter virtual asset controlled by a malicious party.

Process

In accordance with one embodiment, a method and system for validating a virtual asset includes generating virtual asset creation data for creating and launching a virtual asset through a virtual asset creation system. In one embodiment, the virtual asset creation data includes primary virtual asset data associated with the virtual asset itself, and/or the operation of the virtual asset, and/or the operating environment of the virtual asset. In one embodiment, secondary authentication data to be transferred to the virtual asset is also generated.

In one embodiment, primary virtual asset data and the secondary authentication data is transferred from the virtual asset creation system to a virtual asset validation system. In one embodiment, the virtual asset of the virtual asset creation data is then launched and the secondary authentication data is transferred to, or passed into, the virtual asset at launch time.

In one embodiment, primary virtual asset data is transferred from the virtual asset, and/or one or more sources associated with the virtual asset, to the virtual asset validation system and the secondary authentication data is transferred from the virtual asset to the virtual asset validation system.

In one embodiment, the primary virtual asset data from the virtual asset creation system and the primary virtual asset data from the virtual asset, and/or one or more sources associated with the virtual asset, are processed and analyzed to determine if the primary virtual asset data from the two sources match, or have a defined threshold level of similarity. In one embodiment, the secondary authentication data from the virtual asset creation system and the secondary authentication data from the virtual asset are also processed and analyzed to determine if the secondary authentication data from the two sources match, or have a defined threshold level of similarity.

In one embodiment, if the primary virtual asset data from the virtual asset creation system and the primary virtual asset data from the virtual asset, and/or one or more sources associated with the virtual asset, match, or have a defined threshold level of similarity, and the secondary authentication data from the virtual asset creation system and the secondary authentication data from the virtual asset match, or have a defined threshold level of similarity, then the status of the virtual asset is transformed to a status of validated virtual asset eligible to receive sensitive data such as secrets required by the virtual asset for boot up.

Figure 3:
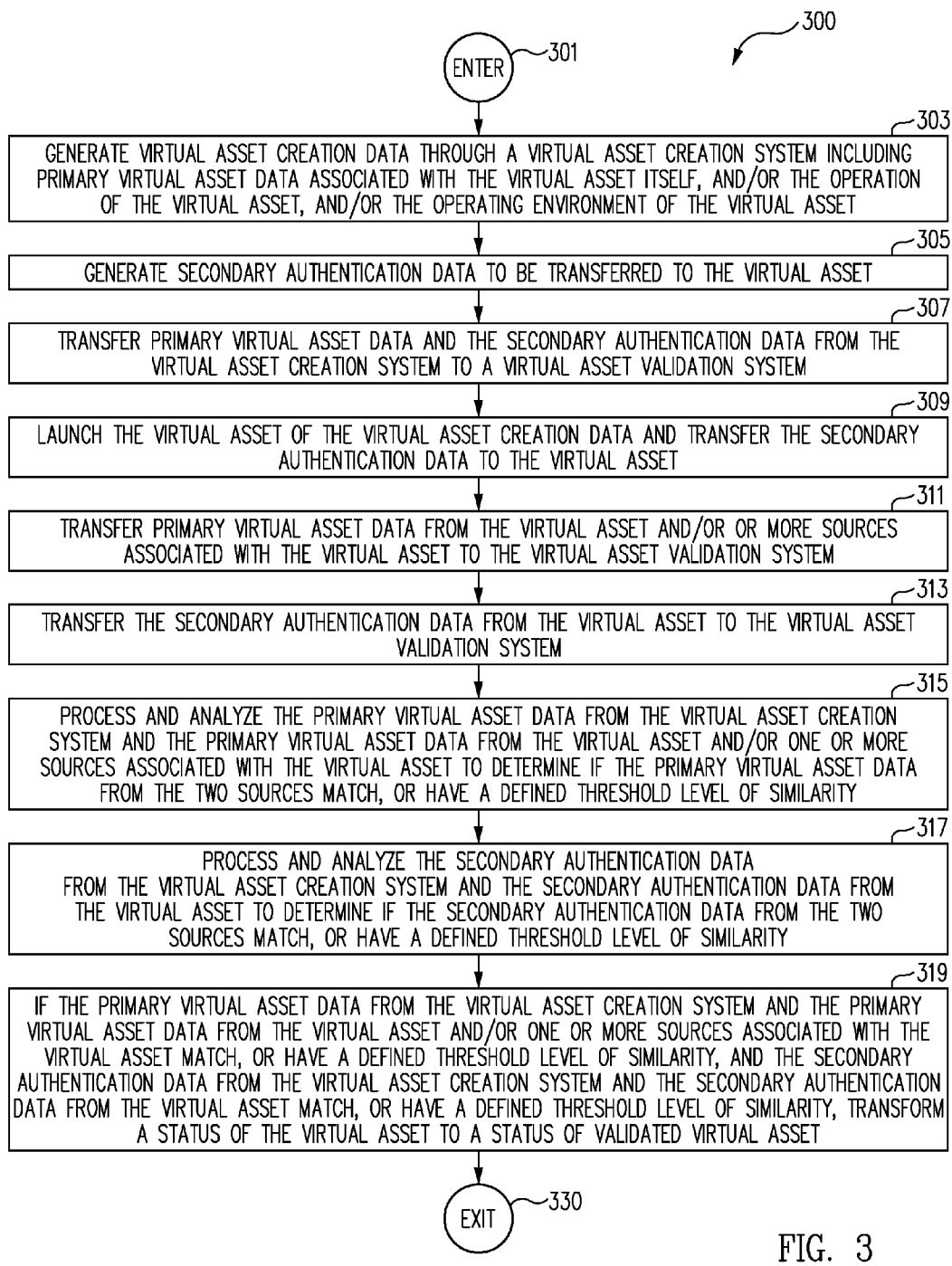
FIG. 3 is a flow chart depicting a process for validating a virtual asset in accordance with one embodiment.

FIG. 3 is a flow chart of a process 300 for validating a virtual asset in accordance with one embodiment. In one embodiment, process 300 for validating a virtual asset begins at ENTER OPERATION 301 of FIG. 3 and process flow proceeds to GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303.

In one embodiment, at GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 virtual asset creation data including primary virtual asset data used to create a virtual asset is generated.

As used herein, the term "virtual asset" includes any virtualized entity or resource, and/or part of an actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In one embodiment, the virtual asset creation data is generated at GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 through a virtual asset creation system such as a virtual asset template through which the creator of a virtual asset can generate operational logic and assign resources and attributes to the virtual asset.

In one embodiment, the virtual asset creation data of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 includes primary virtual asset data associated with the virtual asset itself, and/or the operation of the virtual asset, and/or the operating environment of the virtual asset, such as a cloud computing environment and/or one or more management systems for the cloud computing environment.

As specific illustrative examples, in various embodiments, the primary virtual asset data of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 includes, but is not limited to, one or more of, data indicating the creation time of the virtual asset; data indicating the virtual asset's identification; data indicating the region associated with the virtual asset; data indicating the availability zone associated with the virtual asset; data indicating software modules residing within, or assigned to, the virtual asset; data indicating a number of software modules residing within, or associated with, the virtual asset; data indicating files and/or file names residing within, or assigned to, the virtual asset; data indicating the length of time that it is estimated the virtual asset will take to launch; data indicating the length of time that it historically has taken virtual assets similar to the virtual to launch; data indicating a boot sequence for the virtual asset; any data provided by a hypervisor or virtualization layer associated with the virtual asset; any data provided from a cloud control plane associated with the virtual asset; any data provided by any management system associated with the computing environment of the virtual asset; and/or any combination of "inside" virtual asset data as discussed herein, and/or as known in the art at the time of filing, and/or as developed after the time of filing directed to the virtual asset itself, and/or the operation of the virtual asset, and/or the operating environment of the virtual asset.

In one embodiment, using the virtual asset creation data of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303, a virtual asset is to be instantiated, or launched, in a first computing environment. In one embodiment, as a specific illustrative example, the virtual asset is a virtual machine, or server instance, to be launched in a cloud computing environment.

In one embodiment, once virtual asset creation data including primary virtual asset data used to create a virtual asset is generated at GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303, process flow proceeds to GENERATE SECONDARY AUTHENTICATION DATA TO BE TRANSFERRED TO THE VIRTUAL ASSET OPERATION 305.

In one embodiment, at GENERATE SECONDARY AUTHENTICATION DATA TO BE TRANSFERRED TO THE VIRTUAL ASSET OPERATION 305 secondary authentication data to be transferred to the virtual asset at the time of launch is generated.

In one embodiment, the secondary authentication data is generated at GENERATE SECONDARY AUTHENTICATION DATA TO BE TRANSFERRED TO THE VIRTUAL ASSET OPERATION 305 through the virtual asset creation system of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303, and/or is scheduled to be passed into the virtual asset at launch through the virtual asset creation system.

As noted above, in one embodiment, the primary virtual asset data of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 is data associated with the virtual asset itself, and/or the operation of the virtual asset, and/or the operating environment of the virtual asset. In contrast, in one embodiment, the secondary authentication data of GENERATE SECONDARY AUTHENTICATION DATA TO BE TRANSFERRED TO THE VIRTUAL ASSET OPERATION 305 is data not strictly connected to the virtual asset itself, the operation of the virtual asset, or the operating environment of the virtual asset, i.e., the secondary authentication data represents information that is from "outside" the virtual asset itself, the operation of the virtual asset, or the operating environment of the virtual asset.

In one embodiment, the secondary authentication data of GENERATE SECONDARY AUTHENTICATION DATA TO BE TRANSFERRED TO THE VIRTUAL ASSET OPERATION 305 represents additional, or alternative, challenges, and/or responses to challenges, that are used to authenticate the virtual asset and to further identify the virtual asset as a trusted agent for receiving one or more secrets. As discussed below, in one embodiment, the secondary authentication data is used, or provided to, a virtual asset validation system as part of the bootstrap handshake at the time the virtual asset is first launched, but before secrets required for boot up are provided to the virtual asset.

As specific illustrative examples, in various embodiments, the secondary authentication data of GENERATE SECONDARY AUTHENTICATION DATA TO BE TRANSFERRED TO THE VIRTUAL ASSET OPERATION 305 includes data representing a number, such as a randomly generated number; a word, such as a randomly generated password; a string of words, such as a randomly generated passphrase or nonsense phrase; data associated with the owner of the virtual asset, such as a serial number, identification key, or operation parameter associated with an application that owns the virtual asset; personal data associated with the owner of an account associated with the virtual asset, such physical attributes, e.g., hair color, or hair colors, or eye color, of the owner of an account associated with the virtual asset, or an address, or phone number, or other personal data associated the owner of an account associated with the virtual asset; creation/launch restrictions imposed on the virtual asset such as the time of day when a given class of virtual asset can be launched; any form of token or certificate; and/or any form of secondary authentication data or factors, as discussed herein, and/or as known in the art at the time of filing, and/or as developed after the time of filing.

In one embodiment, once secondary authentication data to be transferred to the virtual asset at the time of launch is generated at GENERATE SECONDARY AUTHENTICATION DATA TO BE TRANSFERRED TO THE VIRTUAL ASSET OPERATION 305, process flow proceeds to TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307.

In one embodiment, once the primary virtual asset data of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 and the secondary authentication data of GENERATE SECONDARY AUTHENTICATION DATA TO BE TRANSFERRED TO THE VIRTUAL ASSET OPERATION 305 are generated, the primary virtual asset data and the secondary authentication data are transferred from, or through, the virtual asset creation system of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 to a virtual asset validation system at TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307.

In one embodiment, the primary virtual asset data and the secondary authentication data are transferred to the virtual asset validation system at TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 via a first communications channel, such as any communications channel discussed herein, and/or as known in the art at the time of filing, and/or as developed/made available after the time of filing.

In one embodiment, the virtual asset validation system of TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 is a module, or subsystem, or a standalone system, implemented, at least in part, in a first computing environment, different from a second computing environment where the virtual asset will be launched.

In one embodiment, the virtual asset validation system of TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 is implemented, at least in part, in a data center associated with the owner of the virtual asset to be launched.

In one embodiment, the virtual asset validation system of TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 is implemented in the same computing environment where the virtual asset creation system is located, and/or the virtual asset creation data is entered.

In another embodiment, the virtual asset validation system of TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 is a module, or subsystem, or a standalone system, implemented, at least in part, in the second computing environment where the virtual asset will be launched.

In one embodiment, at TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 the primary virtual asset data and the secondary authentication data are received by the virtual asset validation system where they are stored for comparison with other primary virtual asset data and the secondary authentication data to be received by the virtual asset validation system from other sources, through other channels, as discussed below. In one embodiment, to this end, a hash of the primary virtual asset data and the secondary authentication data is performed and the hash value is recorded for later use.

In one embodiment, once the primary virtual asset data and the secondary authentication data are generated, and the primary virtual asset data and the secondary authentication data are transferred from, or through, the virtual asset creation system to a virtual asset validation system at TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 process flow proceeds to LAUNCH THE VIRTUAL ASSET OF THE VIRTUAL ASSET CREATION DATA AND TRANSFER THE SECONDARY AUTHENTICATION DATA TO THE VIRTUAL ASSET OPERATION 309.

In one embodiment, at LAUNCH THE VIRTUAL ASSET OF THE VIRTUAL ASSET CREATION DATA AND TRANSFER THE SECONDARY AUTHENTICATION DATA TO THE VIRTUAL ASSET OPERATION 309 the virtual asset of the virtual asset creation data of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 is launched.

In one embodiment, at the time the virtual asset is launched at LAUNCH THE VIRTUAL ASSET OF THE VIRTUAL ASSET CREATION DATA AND TRANSFER THE SECONDARY AUTHENTICATION DATA TO THE VIRTUAL ASSET OPERATION 309, the secondary authentication data of GENERATE SECONDARY AUTHENTICATION DATA TO BE TRANSFERRED TO THE VIRTUAL ASSET OPERATION 305 is transferred, or passed into, the virtual asset of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303.

In one embodiment the secondary authentication data is passed into the virtual asset through a second communication channel, different from the first communication channel, such as any communication channel discussed herein, and/or as known in the art at the time of filing, and/or as developed/made available after the time of filing.

In one embodiment, at LAUNCH THE VIRTUAL ASSET OF THE VIRTUAL ASSET CREATION DATA AND TRANSFER THE SECONDARY AUTHENTICATION DATA TO THE VIRTUAL ASSET OPERATION 309 the secondary authentication data is passed into the virtual asset at the time of launch of the virtual asset, but before the virtual asset receives secrets data representing the one or more secrets, such as encryption keys, or preliminary boot data, required by the virtual asset in order to boot up for operation and its intended role.

In one embodiment, once the virtual asset of the virtual asset creation data is launched and the secondary authentication data is passed into the virtual asset at the time of launch, at LAUNCH THE VIRTUAL ASSET OF THE VIRTUAL ASSET CREATION DATA AND TRANSFER THE SECONDARY AUTHENTICATION DATA TO THE VIRTUAL ASSET OPERATION 309, process flow proceeds TRANSFER PRIMARY VIRTUAL ASSET DATA FROM THE VIRTUAL ASSET AND/OR ONE OR MORE SOURCES ASSOCIATED WITH THE VIRTUAL ASSET TO THE VIRTUAL ASSET VALIDATION SYSTEM OPERATION 311.

In one embodiment, at TRANSFER PRIMARY VIRTUAL ASSET DATA FROM THE VIRTUAL ASSET AND/OR ONE OR MORE SOURCES ASSOCIATED WITH THE VIRTUAL ASSET TO THE VIRTUAL ASSET VALIDATION SYSTEM OPERATION 311 primary virtual asset data of GENERATE VIRTUAL ASSET CREATION DATA THROUGH A VIRTUAL ASSET CREATION SYSTEM INCLUDING PRIMARY VIRTUAL ASSET DATA ASSOCIATED WITH THE VIRTUAL ASSET ITSELF, AND/OR THE OPERATION OF THE VIRTUAL ASSET, AND/OR THE OPERATING ENVIRONMENT OF THE VIRTUAL ASSET OPERATION 303 is transferred to the virtual asset validation system from the virtual asset, and/or one or more sources associated with virtual asset.

In one embodiment, at TRANSFER PRIMARY VIRTUAL ASSET DATA FROM THE VIRTUAL ASSET AND/OR ONE OR MORE SOURCES ASSOCIATED WITH THE VIRTUAL ASSET TO THE VIRTUAL ASSET VALIDATION SYSTEM OPERATION 311 at least part of the primary virtual asset data is transferred to the virtual asset validation system from the virtual asset itself.

In one embodiment, at TRANSFER PRIMARY VIRTUAL ASSET DATA FROM THE VIRTUAL ASSET AND/OR ONE OR MORE SOURCES ASSOCIATED WITH THE VIRTUAL ASSET TO THE VIRTUAL ASSET VALIDATION SYSTEM OPERATION 311 at least part of the primary virtual asset data is transferred to the virtual asset validation system from one or more sources associated with the virtual asset, such as a virtual asset monitor; a hypervisor or virtualization layer associated with the virtual asset; a cloud control plane associated with the virtual asset; any management system associated with the computing environment of the virtual asset; any source associated with the virtual asset capable of providing data indicating the creation time of the virtual asset; any source associated with the virtual asset capable of providing data indicating the virtual asset's identification; any source associated with the virtual asset capable of providing data indicating the region associated with the virtual asset; any source associated with the virtual asset capable of providing data indicating the availability zone associated with the virtual asset; any source associated with the virtual asset capable of providing data indicating software modules residing within, or assigned to, the virtual asset; any source associated with the virtual asset capable of providing data indicating a number of software modules residing within, or associated with, the virtual asset; any source associated with the virtual asset capable of providing data indicating files and/or file names residing within, or assigned to, the virtual asset; any source associated with the virtual asset capable of providing data indicating the exact configuration of the virtual asset; any source associated with the virtual asset capable of providing data indicating a boot sequence for the virtual asset; any source associated with the virtual asset capable of providing data indicating the length of time that it is estimated the virtual asset will take to launch; any source associated with the virtual asset capable of providing data indicating the length of time that it historically has taken virtual assets similar to the virtual to launch; and/or any combination of sources of primary virtual asset data as discussed herein, and/or as known in the art at the time of filing, and/or as developed after the time of filing.

In one embodiment, at TRANSFER PRIMARY VIRTUAL ASSET DATA FROM THE VIRTUAL ASSET AND/OR ONE OR MORE SOURCES ASSOCIATED WITH THE VIRTUAL ASSET TO THE VIRTUAL ASSET VALIDATION SYSTEM OPERATION 311 the primary virtual asset data is transferred to the virtual asset validation system via a third communications channel that, in one embodiment, is distinct from first communication channel and second communication channel, and is any communications channel as discussed herein, and/or as known in the art at the time of filing, and/or as developed/made available after the time of filing.

In one embodiment, once primary virtual asset data is transferred to the virtual asset validation system from the virtual asset, and/or one or more sources associated with virtual asset at TRANSFER PRIMARY VIRTUAL ASSET DATA FROM THE VIRTUAL ASSET AND/OR ONE OR MORE SOURCES ASSOCIATED WITH THE VIRTUAL ASSET TO THE VIRTUAL ASSET VALIDATION SYSTEM OPERATION 311, process flow proceeds to TRANSFER THE SECONDARY AUTHENTICATION DATA FROM THE VIRTUAL ASSET TO THE VIRTUAL ASSET VALIDATION SYSTEM OPERATION 313.

In one embodiment, at TRANSFER THE SECONDARY AUTHENTICATION DATA FROM THE VIRTUAL ASSET TO THE VIRTUAL ASSET VALIDATION SYSTEM OPERATION 313 the secondary authentication data of LAUNCH THE VIRTUAL ASSET OF THE VIRTUAL ASSET CREATION DATA AND TRANSFER THE SECONDARY AUTHENTICATION DATA TO THE VIRTUAL ASSET OPERATION 309 is transferred to the virtual asset validation system from the virtual asset.

In one embodiment, at TRANSFER THE SECONDARY AUTHENTICATION DATA FROM THE VIRTUAL ASSET TO THE VIRTUAL ASSET VALIDATION SYSTEM OPERATION 313 the secondary authentication data is transferred to the virtual asset validation system via the third communications channel.

In one embodiment, once the secondary authentication data of LAUNCH THE VIRTUAL ASSET OF THE VIRTUAL ASSET CREATION DATA AND TRANSFER THE SECONDARY AUTHENTICATION DATA TO THE VIRTUAL ASSET OPERATION 309 is transferred to the virtual asset validation system from the virtual asset at TRANSFER THE SECONDARY AUTHENTICATION DATA FROM THE VIRTUAL ASSET TO THE VIRTUAL ASSET VALIDATION SYSTEM OPERATION 313, process flow proceeds to PROCESS AND ANALYZE THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET TO DETERMINE IF THE PRIMARY VIRTUAL ASSET DATA FROM THE TWO SOURCES MATCH, OR HAVE A DEFINED THRESHOLD LEVEL OF SIMILARITY OPERATION 315.

In one embodiment, at PROCESS AND ANALYZE THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET TO DETERMINE IF THE PRIMARY VIRTUAL ASSET DATA FROM THE TWO SOURCES MATCH, OR HAVE A DEFINED THRESHOLD LEVEL OF SIMILARITY OPERATION 315, the primary virtual asset data from the virtual asset creation system of TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 and the primary virtual asset data from the virtual asset, and/or one or more sources associated with the virtual asset, of TRANSFER PRIMARY VIRTUAL ASSET DATA FROM THE VIRTUAL ASSET AND/OR ONE OR MORE SOURCES ASSOCIATED WITH THE VIRTUAL ASSET TO THE VIRTUAL ASSET VALIDATION SYSTEM OPERATION 311 are processed and analyzed to determine if the primary virtual asset data from the two sources match, or have a defined threshold level of similarity.

In one embodiment, at PROCESS AND ANALYZE THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET TO DETERMINE IF THE PRIMARY VIRTUAL ASSET DATA FROM THE TWO SOURCES MATCH, OR HAVE A DEFINED THRESHOLD LEVEL OF SIMILARITY OPERATION 315 the primary virtual asset data from the virtual asset creation system and the primary virtual asset data from the virtual asset, and/or one or more sources associated with the virtual asset, are processed and analyzed to determine if the primary virtual asset data from the virtual asset creation system and the primary virtual asset data from the virtual asset, and/or one or more sources associated with the virtual asset, match, or have a defined threshold level of similarity, in accordance with one or more similarity analysis algorithms, including, in one embodiment, one or more weighted similarity analysis algorithms.

In one embodiment, the defined threshold level of similarity is open-endedly defined such that the threshold level of similarity can be adjusted according the sensitivity of the data being transferred and/or the environment into which the sensitive data is being transferred, and/or the type of virtual asset to which the sensitive data is being transferred.

In one embodiment, the one or more similarity analysis algorithms take into account the number and types of primary virtual asset data being analyzed. In one embodiment, the one or more similarity analysis algorithms apply weighting factors to the types of primary virtual asset data being analyzed in accordance with pre-determined policies.

In one embodiment, once the primary virtual asset data from the virtual asset creation system and the primary virtual asset data from the virtual asset, and/or one or more sources associated with the virtual asset, are processed and analyzed to determine if the primary virtual asset data from the two sources match, or have a defined threshold level of similarity at PROCESS AND ANALYZE THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET TO DETERMINE IF THE PRIMARY VIRTUAL ASSET DATA FROM THE TWO SOURCES MATCH, OR HAVE A DEFINED THRESHOLD LEVEL OF SIMILARITY OPERATION 315, process flow proceeds to PROCESS AND ANALYZE THE SECONDARY AUTHENTICATION DATA FROM THE VIRTUAL ASSET CREATION SYSTEM AND THE SECONDARY AUTHENTICATION DATA FROM THE VIRTUAL ASSET TO DETERMINE IF THE SECONDARY AUTHENTICATION DATA FROM THE TWO SOURCES MATCH, OR HAVE A DEFINED THRESHOLD LEVEL OF SIMILARITY OPERATION 317.

In one embodiment, at PROCESS AND ANALYZE THE SECONDARY AUTHENTICATION DATA FROM THE VIRTUAL ASSET CREATION SYSTEM AND THE SECONDARY AUTHENTICATION DATA FROM THE VIRTUAL ASSET TO DETERMINE IF THE SECONDARY AUTHENTICATION DATA FROM THE TWO SOURCES MATCH, OR HAVE A DEFINED THRESHOLD LEVEL OF SIMILARITY OPERATION 317 the secondary authentication data from the virtual asset creation system of TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 and the secondary authentication data from the virtual asset of TRANSFER THE SECONDARY AUTHENTICATION DATA FROM THE VIRTUAL ASSET TO THE VIRTUAL ASSET VALIDATION SYSTEM OPERATION 313 are processed and analyzed to determine if the secondary authentication data from the two sources match, or have a defined threshold level of similarity.

In one embodiment, at PROCESS AND ANALYZE THE SECONDARY AUTHENTICATION DATA FROM THE VIRTUAL ASSET CREATION SYSTEM AND THE SEC- ONDARY AUTHENTICATION DATA FROM THE VIRTUAL ASSET TO DETERMINE IF THE SECONDARY AUTHENTICATION DATA FROM THE TWO SOURCES MATCH, OR HAVE A DEFINED THRESHOLD LEVEL OF SIMILARITY OPERATION 317 the secondary authentication data from the virtual asset creation system and the secondary authentication data from the virtual asset are processed and analyzed to determine if the secondary authentication data from the virtual asset creation system and the secondary authentication data from the virtual asset match, or have a defined threshold level of similarity, in accordance with one or more similarity analysis algorithms, including, in one embodiment, one or more weighted similarity analysis algorithms.

In one embodiment, the defined threshold level of similarity is open-endedly defined such that the threshold level of similarity can be adjusted according the sensitivity of the data being transferred and/or the environment into which the sensitive data is being transferred, and/or the type of virtual asset to which the sensitive data is being transferred.

In one embodiment, the one or more similarity analysis algorithms take into account the type of secondary authentication data being analyzed. In one embodiment, the one or more similarity analysis algorithms apply weighting factors to the type of secondary authentication data being analyzed in accordance with pre-determined policies.

In one embodiment, the processing and analyzing of the primary virtual asset data from the virtual asset creation system and the primary virtual asset data from the virtual asset, and/or one or more sources associated with the virtual asset, of PROCESS AND ANALYZE THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET TO DETERMINE IF THE PRIMARY VIRTUAL ASSET DATA FROM THE TWO SOURCES MATCH, OR HAVE A DEFINED THRESHOLD LEVEL OF SIMILARITY OPERATION 315 and the processing and analyzing of the secondary authentication data from the virtual asset creation system and the secondary authentication data from the virtual asset of PROCESS AND ANALYZE THE SECONDARY AUTHENTICATION DATA FROM THE VIRTUAL ASSET CREATION SYSTEM AND THE SECONDARY AUTHENTICATION DATA FROM THE VIRTUAL ASSET TO DETERMINE IF THE SECONDARY AUTHENTICATION DATA FROM THE TWO SOURCES MATCH, OR HAVE A DEFINED THRESHOLD LEVEL OF SIMILARITY OPERATION 317 is performed by hashing the primary virtual asset data and the secondary authentication data from the virtual asset creation system to generate a first hash value. Then, in one embodiment, the primary virtual asset data from the virtual asset, and/or one or more sources associated with the virtual asset, and the secondary authentication data from the virtual asset are also hashed to generate a second hash value. Then, in one embodiment, the first hash value and the second hash value are compared to determine if the first hash value and the second hash value match, or have a defined threshold level of similarity.

In one embodiment, once the secondary authentication data from the virtual asset creation system of TRANSFER PRIMARY VIRTUAL ASSET DATA AND THE SECONDARY AUTHENTICATION DATA FROM THE VIRTUAL ASSET CREATION SYSTEM TO A VIRTUAL ASSET VALIDATION SYSTEM OPERATION 307 and the secondary authentication data from the virtual asset of TRANSFER THE SECONDARY AUTHENTICATION DATA FROM THE VIRTUAL ASSET TO THE VIRTUAL ASSET VALIDATION SYSTEM OPERATION 313 are processed and analyzed to determine if the secondary authentication data from the two sources match, or have a defined threshold level of similarity at PROCESS AND ANALYZE THE SECONDARY AUTHENTICATION DATA FROM THE VIRTUAL ASSET CREATION SYSTEM AND THE SECONDARY AUTHENTICATION DATA FROM THE VIRTUAL ASSET TO DETERMINE IF THE SECONDARY AUTHENTICATION DATA FROM THE TWO SOURCES MATCH, OR HAVE A DEFINED THRESHOLD LEVEL OF SIMILARITY OPERATION 317, process flow proceeds to IF THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET MATCH, OR HAVE A DEFINED THRESHOLD LEVEL OF SIMILARITY, AND THE SECONDARY AUTHENTICATION DATA FROM THE VIRTUAL ASSET CREATION SYSTEM AND THE SECONDARY AUTHENTICATION DATA FROM THE VIRTUAL ASSET MATCH, OR HAVE A DEFINED THRESHOLD LEVEL OF SIMILARITY, TRANSFORM A STATUS OF THE VIRTUAL ASSET TO A STATUS OF VALIDATED VIRTUAL ASSET OPERATION 319.

In one embodiment, if the primary virtual asset data from the virtual asset creation system and the primary virtual asset data from the virtual asset, and/or one or more sources associated with the virtual asset, match, or have a defined threshold level of similarity, at PROCESS AND ANALYZE THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET TO DETERMINE IF THE PRIMARY VIRTUAL ASSET DATA FROM THE TWO SOURCES MATCH, OR HAVE A DEFINED THRESHOLD LEVEL OF SIMILARITY OPERATION 315, and the secondary authentication data from the virtual asset creation system and the secondary authentication data from the virtual asset match, or have a defined threshold level of similarity, at PROCESS AND ANALYZE THE SECONDARY AUTHENTICATION DATA FROM THE VIRTUAL ASSET CREATION SYSTEM AND THE SECONDARY AUTHENTICATION DATA FROM THE VIRTUAL ASSET TO DETERMINE IF THE SECONDARY AUTHENTICATION DATA FROM THE TWO SOURCES MATCH, OR HAVE A DEFINED THRESHOLD LEVEL OF SIMILARITY OPERATION 317, then at IF THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET MATCH, OR HAVE A DEFINED THRESHOLD LEVEL OF SIMILARITY, AND THE SECONDARY AUTHENTICATION DATA FROM THE VIRTUAL ASSET CREATION SYSTEM AND THE SECONDARY AUTHENTICATION DATA FROM THE VIRTUAL ASSET MATCH, OR HAVE A DEFINED THRESHOLD LEVEL OF SIMILARITY, TRANSFORM A STATUS OF THE VIRTUAL ASSET TO A STATUS OF VALIDATED VIRTUAL ASSET OPERATION 319 the status of the virtual asset is transformed to a status of validated virtual asset.

In one embodiment, once the status of the virtual asset is transformed to the status of a validated virtual asset at IF THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET MATCH, OR HAVE A DEFINED THRESHOLD LEVEL OF SIMILARITY, AND THE SECONDARY AUTHENTICATION DATA FROM THE VIRTUAL ASSET CREATION SYSTEM AND THE SECONDARY AUTHENTICATION DATA FROM THE VIRTUAL ASSET MATCH, OR HAVE A DEFINED THRESHOLD LEVEL OF SIMILARITY, TRANSFORM A STATUS OF THE VIRTUAL ASSET TO A STATUS OF VALIDATED VIRTUAL ASSET OPERATION 319, the virtual asset is determined to be eligible to receive sensitive data, including data representing one or more secrets required by the virtual asset to boot up and to begin to perform the functions for which the virtual asset was created.

As used herein, the term "secrets" includes any information, credentials, or other devices, necessary to access one or more resources and/or computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data, and that are required for such access, as discussed herein, and/or as known/available in the art at the time of filing, and/or as developed/made available after the time of filing.

Consequently, in one embodiment, the virtual asset is validated using at least two sources of validation data, including secondary authentication data representing information and data from outside the virtual asset, the operation of the virtual asset, and/or the operating environment of the virtual asset, before any secrets are passed to the virtual asset. As a result, the ability of a malicious party to falsely identify itself, or "spoof", the owner of a virtual asset into providing sensitive data to the malicious party is significantly, if not completely, removed.

In one embodiment, once the status of the virtual asset is transformed to a status of validated virtual asset at IF THE PRIMARY VIRTUAL ASSET DATA FROM THE VIRTUAL ASSET CREATION SYSTEM AND THE PRIMARY VIRTUAL ASSET DATA FROM THE VIRTUAL ASSET AND/OR ONE OR MORE SOURCES ASSOCIATED WITH THE VIRTUAL ASSET MATCH, OR HAVE A DEFINED THRESHOLD LEVEL OF SIMILARITY, AND THE SECONDARY AUTHENTICATION DATA FROM THE VIRTUAL ASSET CREATION SYSTEM AND THE SECONDARY AUTHENTICATION DATA FROM THE VIRTUAL ASSET MATCH, OR HAVE A DEFINED THRESHOLD LEVEL OF SIMILARITY, TRANSFORM A STATUS OF THE VIRTUAL ASSET TO A STATUS OF VALIDATED VIRTUAL ASSET OPERATION 319, process flow proceeds to EXIT OPERATION 330.

In one embodiment, at EXIT OPERATION 330 process 300 for validating a virtual asset is exited to await new data.

Using process 300 for validating a virtual asset discussed above, when a virtual asset is launched, the virtual asset is validated using both "inside" information and data associated with the virtual asset, the operation of the virtual asset, and/or the operational environment of the virtual asset, as well as "outside" information having no direct relation to the virtual asset itself, the operation of the virtual asset, and/or the operational environment of the virtual asset, and as known only to the owner of the virtual asset.

Consequently, using process 300 for validating a virtual asset, the identity of the virtual asset as a legitimate virtual asset owned and created by the owner of the virtual asset is reliably established before any sensitive data is transferred to the virtual asset, including data representing secrets required by the virtual asset to actually boot up and perform the function assigned to it by the owner of the virtual asset. Consequently, using process 300 for validating a virtual asset, there is virtually no opportunity for a malicious party to "spoof" the owner of virtual assets into believing a malicious virtual asset, or other software, associated with the malicious party is a virtual asset owned by the owner of virtual assets. As a result, there is little chance that sensitive data or secrets will be passed to an imposter virtual asset controlled by a malicious party.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:
1. A system for validating a virtual asset comprising:
at least one processor; and
at least one memory coupled to the at least one processor, the at least one memory having stored therein instructions which when executed by any set of the one or more processors, perform a process for validating a virtual asset, the process for validating a virtual asset including:
generating, by a virtual asset creation system, virtual asset creation data, the virtual asset creation data including primary virtual asset data associated with the virtual asset itself, and/or the operation of the virtual asset, and/or the operating environment of the virtual asset;
generating secondary authentication data, the secondary authentication data including personal data regarding the owner of an account associated with the virtual asset;
transferring, by the virtual asset creation system, primary virtual asset data and the secondary authentication data from the virtual asset creation template to a virtual asset validation system, via a first communications channel;
launching, by the virtual asset creation system using the virtual asset creation data, the virtual asset of the virtual asset creation data, the launch process including transferring the secondary authentication data from the virtual asset creation template to the virtual asset validation system, the launch process further including transferring, by the virtual asset creation system, via a second communications channel, at the time of the launch of the virtual asset, the secondary authentication data into the virtual asset;
transferring, via a third communication channel, primary virtual asset data and the secondary authentication data from the virtual asset to the virtual asset validation system;
processing and analyzing, during a boot-up process for the virtual asset when the virtual asset is first launched, the primary virtual asset data from the virtual asset creation template and the primary virtual asset data from the virtual asset to determine if the primary virtual asset data from the two sources match, or have a defined threshold level of similarity;
processing and analyzing, during a boot-up process for the virtual asset when the virtual asset is first launched, the secondary authentication data from the virtual asset creation template and the secondary authentication data from the virtual asset to determine if the secondary authentication data from the two sources match, or have a defined threshold level of similarity;
upon determining, during a boot-up process for the virtual asset when the virtual asset is first launched, that the primary virtual asset data from the virtual asset creation template and the primary virtual asset data from the virtual asset, and/or one or more sources associated with the virtual asset, match, or have a defined threshold level of similarity and the secondary authentication data from the virtual asset creation template and the secondary authentication data from the virtual asset match, or have a defined threshold level of similarity, transforming a status of the virtual asset to a status of validated virtual asset; and
providing, following the status of the virtual asset being transformed to the status of validated asset, and still during the boot-up process during a boot-up process for the virtual asset when the virtual asset is first launched, secrets required for boot-up to the virtual asset.

2. The system for validating a virtual asset of claim 1 wherein the virtual asset is a virtual asset selected from the group of the virtual assets consisting of:
- a virtual machine;
- a virtual server;
- a database or data store;
- an instance in a cloud environment;
- a cloud environment access system;
- part of a mobile device;
- part of a remote sensor;
- part of a laptop;
- part of a desktop;
- part of a point-of-sale device;
- part of an ATM; and
- part of an electronic voting machine.

3. The system for validating a virtual asset of claim 1 wherein at least part of the primary virtual asset data includes virtual asset data selected from the group of primary virtual asset data consisting of:
- data indicating the creation time of the virtual asset;
- data indicating the virtual asset's identification;
- data indicating the region associated with the virtual asset;
- data indicating the availability zone associated with the virtual asset;
- data indicating software modules residing within the virtual asset;
- data indicating a number of software modules residing within the virtual asset;
- data indicating files residing within the virtual asset;
- data indicating the exact configuration of the virtual asset;
- data indicating a boot sequence for the virtual asset;
- any data provided by a hypervisor associated with the virtual asset;
- any data provided by a management system associated with the computing environment of the virtual asset;
- data indicating the length of time that it is estimated the virtual asset will take to launch;
- data indicating the length of time that it historically has taken virtual assets similar to the virtual asset to launch;
- data indicating a boot sequence for the virtual asset; and
- any combination thereof.

4. The system for validating a virtual asset of claim 1 wherein at least part of the secondary authentication data includes data selected from the group of secondary authentication data consisting of:
- one or more randomly generated numbers;
- one or more randomly generated letters;
- a randomly generated password;
- a randomly generated passphrase;
- data associated with the owner of the virtual asset;
- personal data associated with the owner of an account associated with the virtual asset;
- creation/launch restrictions associated with the virtual asset;
- a token; and
- any combination thereof.

5. The system for validating a virtual asset of claim 1 wherein the one or more sources associated with the virtual asset include the virtual asset.

6. The system for validating a virtual asset of claim 1 wherein the one or more sources associated with the virtual asset include a virtual asset monitor.

7. The system for validating a virtual asset of claim 6 wherein the virtual asset monitor is a hypervisor.

8. The system for validating a virtual asset of claim 1 wherein processing and analyzing the primary virtual asset data from the virtual asset creation template and the primary virtual asset data from the virtual asset, and/or one or more sources associated with the virtual asset, to determine if the primary virtual asset data from the two sources match, or have a defined threshold level of similarity, and processing and analyzing the secondary authentication data from the virtual asset creation template and the secondary authentication data from the virtual asset to determine if the secondary authentication data from the two sources match, or have a defined threshold level of similarity, includes:
- hashing the primary virtual asset data and the secondary authentication data from the virtual asset creation template to generate a first hash value;
- hashing the primary virtual asset data from the virtual asset, and/or one or more sources associated with the virtual asset, and the secondary authentication data from the virtual asset to generate a second hash value;
- and comparing the first hash value with the second hash value to determine if the first hash value and the second hash value match, or have a defined threshold level of similarity.

9. The system for validating a virtual asset of claim 1 further comprising:
providing the validated virtual asset with sensitive data.

10. The system for validating a virtual asset of claim 9 wherein the sensitive data includes data representing one or more secrets required by the virtual asset to boot up.

11. The system for validating a virtual asset of claim 9 wherein the sensitive data includes data representing one or more secrets selected from the group of secrets consisting of:
- boot up data;
- usernames;
- passwords;
- passphrases;
- encryption keys;
- digital certificates;
- multifactor authentication data;
- account numbers;
- identification numbers; and
- any combination thereof.

12. A system for validating a virtual asset comprising:
at least one processor; and
at least one memory coupled to the at least one processor, the at least one memory having stored therein instructions which when executed by any set of the one or more processors, perform a process for validating a virtual asset, the process for validating a virtual asset including:
generating, by a first computing environment, virtual asset creation data, the virtual asset creation data including primary virtual asset data associated with the virtual asset itself, and/or the operations of the virtual asset, and/or the operating environment of the virtual asset;
generating secondary authentication data, the secondary authentication data including personal data of the owner of an account associated with the virtual asset;
transferring, by the first computing system, primary virtual asset data and the secondary authentication data from the virtual asset creation template to a virtual asset validation system, the transfer being made over a first communication channel;
launching, by the first computing system using the virtual asset creation data, the virtual asset of the virtual asset creation data in the second computing environment, the launch process including transferring the secondary authentication data to the virtual asset, the launch process further including transferring, by the virtual asset creation system, via a second communications channel, at the time of the launch of the virtual asset, the secondary authentication data into the virtual asset, the transfer into the virtual asset being made through a second communications channel different from the first communications channel;

transferring, via a third communication channel, primary virtual asset data and the secondary authentication data from the virtual asset to the virtual asset validation system;

processing and analyzing, during a boot-up process for the virtual asset when the virtual asset is first launched, the primary virtual asset data from the virtual asset creation template and the primary virtual asset data from the virtual asset, to determine if the primary virtual asset data from the two sources match, or have a defined threshold level of similarity;

processing and analyzing, during a boot-up process for the virtual asset when the virtual asset is first launched, the secondary authentication data from the virtual asset creation template and the secondary authentication data from the virtual asset to determine if the secondary authentication data from the two sources match, or have a defined threshold level of similarity;

upon determining, during a boot-up process for the virtual asset when the virtual asset is first launched, that the primary virtual asset data from the virtual asset creation template and the primary virtual asset data from the virtual asset, and/or one or more sources associated with the virtual asset, match, or have a defined threshold level of similarity, and the secondary authentication data from the virtual asset creation template and the secondary authentication data from the virtual asset match, or have a defined threshold level of similarity, transforming a status of the virtual asset to a status of validated virtual asset; and providing, following the status of the virtual asset being transformed to the status of validated asset, and still during the boot-up process during a boot-up process for the virtual asset when the virtual asset is first launched, secrets required for boot-up to the virtual asset.

13. The system for validating a virtual asset of claim 12 wherein the first computing environment is a trusted computing environment.

14. The system for validating a virtual asset of claim 13 wherein the first computing environment is a data center network.

15. The system for validating a virtual asset of claim 12 wherein the second computing environment is an untrusted computing environment.

16. The system for validating a virtual asset of claim 15 wherein the second computing environment is a cloud computing environment.

17. The system for validating a virtual asset of claim 16 wherein the virtual asset is an instance launched in the cloud computing environment.

18. The system for validating a virtual asset of claim 12 wherein the virtual asset is a virtual asset selected from the group of the virtual assets consisting of:
  a virtual machine;
  a virtual server;
  a database or data store;
  an instance in a cloud environment;
  a cloud environment access system;
  part of a mobile device;
  part of a remote sensor;
  part of a laptop;
  part of a desktop;
  part of a point-of-sale device;
  part of an ATM; and
  part of an electronic voting machine.

19. The system for validating a virtual asset of claim 12 wherein at least part of the primary virtual asset data includes virtual asset data selected from the group of primary virtual asset data consisting of:
  data indicating the region associated with the virtual asset;
  data indicating the availability zone associated with the virtual asset;
  data indicating software modules residing within the virtual asset;
  data indicating a number of software modules residing within the virtual asset;
  data indicating files residing within the virtual asset;
  data indicating the exact configuration of the virtual asset;
  data indicating a boot sequence for the virtual asset;
  any data provided by a hypervisor associated with the virtual asset;
  any data provided by a management system associated with the computing environment of the virtual asset;
  data indicating the length of time that it is estimated the virtual asset will take to launch;
  data indicating the length of time that it historically has taken virtual assets similar to the virtual asset to launch
  data indicating a boot sequence for the virtual asset; and
  any combination thereof.

20. The system for validating a virtual asset of claim 12 wherein at least part of the secondary authentication data includes data selected from the group of secondary authentication data consisting of:
  one or more randomly generated numbers;
  one or more randomly generated letters;
  a randomly generated password;
  a randomly generated passphrase;
  data associated with the owner of the virtual asset;
  creation/launch restrictions associated with the virtual asset;
  a token; and
  any combination thereof.

21. The system for validating a virtual asset of claim 12 wherein the one or more sources associated with the virtual asset in the second computing environment include the virtual asset.

22. The system for validating a virtual asset of claim 12 wherein the one or more sources associated with the virtual asset in the second computing environment include a virtual asset monitor.

23. The system for validating a virtual asset of claim 22 wherein the virtual asset monitor is a hypervisor.

24. The system for validating a virtual asset of claim 12 further comprising:
  providing the validated virtual asset with sensitive data.

25. The system for validating a virtual asset of claim 24 wherein the sensitive data includes data representing one or more secrets required by the virtual asset to boot up.

26. The system for validating a virtual asset of claim 25 wherein the sensitive data includes data representing one or more secrets selected from the group of secrets consisting of:
  boot up data;
  usernames;
  passwords;
  passphrases;
  encryption keys;
  digital certificates;
  multifactor authentication data;
  account numbers;
  identification numbers; and
  any combination thereof.

27. A system for validating a virtual asset comprising:
at least one processor; and
at least one memory coupled to the at least one processor, the at least one memory having stored therein instructions which when executed by any set of the one or more processors, perform a process for validating a virtual asset, the process for validating a virtual asset including:
generating, by a virtual asset creation system, virtual asset creation data, the virtual asset creation data including primary virtual asset data associated with the virtual asset itself, and/or the operations of the virtual asset, and/or the operating environment of the virtual asset;
generating secondary authentication data to be transferred into the virtual asset, the secondary authentication data including personal data of the owner of an account associated with the virtual asset;
transferring, by the virtual asset creation system, primary virtual asset data and the secondary authentication data from the virtual asset creation template to a virtual asset validation system using a first communications channel;
the virtual asset validation system receiving the primary virtual asset data and the secondary authentication data from the virtual asset creation template through the first communications channel;
launching, by the virtual asset creation system using the virtual asset creation data, the virtual asset of the virtual asset creation data in the cloud computing environment, the launch process including transferring the secondary authentication data into the virtual asset using a second communications channel, the launch process further including transferring, by the virtual asset creation system at the time of the launch of the virtual asset, the secondary authentication data into the virtual asset, the second communications channel being distinct from the first communications channel;
the virtual asset receiving the secondary authentication data through the second communications channel;
transferring primary virtual asset data and the secondary authentication data from the virtual asset to the virtual asset validation system using a third communications channel, the third communications channel being distinct from the first and second communications channels;
the virtual asset validation system receiving the primary virtual asset data from the virtual asset through the third communications channel;
the virtual asset validation system receiving the secondary authentication data from the virtual asset through the third communications channel;
processing and analyzing, during a boot-up process for the virtual asset when the virtual asset is first launched, the primary virtual asset data from the virtual asset creation template and the primary virtual asset data from the virtual asset to determine if the primary virtual asset data from the two sources match, or have a defined threshold level of similarity;
processing and analyzing, during a boot-up process for the virtual asset when the virtual asset is first launched, the secondary authentication data from the virtual asset creation template and the secondary authentication data from the virtual asset to determine if the secondary authentication data from the two sources match, or have a defined threshold level of similarity;
upon determining, during a boot-up process for the virtual asset when the virtual asset is first launched, that the primary virtual asset data from the virtual asset creation template and the primary virtual asset data from the virtual asset, and/or one or more sources associated with the virtual asset, match, or have a defined threshold level of similarity, and the secondary authentication data from the virtual asset creation template and the secondary authentication data from the virtual asset match, or have a defined threshold level of similarity, transforming a status of the virtual asset to a status of validated virtual asset; and
providing, following the status of the virtual asset being transformed to the status of validated asset, and still during the boot-up process during a boot-up process for the virtual asset when the virtual asset is first launched, secrets required for boot-up to the virtual asset.

28. The system for validating a virtual asset of claim 27 wherein the virtual asset is a virtual asset selected from the group of the virtual assets consisting of:
a virtual machine;
a virtual server;
a database or data store;
an instance in a cloud environment;
a cloud environment access system;
part of a mobile device;
part of a remote sensor;
part of a laptop;
part of a desktop;
part of a point-of-sale device;
part of an ATM; and
part of an electronic voting machine.

29. The system for validating a virtual asset of claim 27 wherein at least part of the primary virtual asset data includes virtual asset data selected from the group of primary virtual asset data consisting of:
data indicating the creation time of the virtual asset;
data indicating the virtual asset's identification;
data indicating the region associated with the virtual asset;
data indicating the availability zone associated with the virtual asset;
data indicating software modules residing within the virtual asset;
data indicating a number of software modules residing within the virtual asset;
data indicating files residing within the virtual asset;
data indicating the exact configuration of the virtual asset;
data indicating a boot sequence for the virtual asset;
any data provided by a hypervisor associated with the virtual asset;
any data provided by a management system associated with the computing environment of the virtual asset;
data indicating the length of time that it is estimated the virtual asset will take to launch;
data indicating the length of time that it historically has taken virtual assets similar to the virtual asset to launch
data indicating a boot sequence for the virtual asset; and
any combination thereof.

30. The system for validating a virtual asset of claim 27 wherein at least part of the secondary authentication data includes data selected from the group of secondary authentication data consisting of:
one or more randomly generated numbers;
one or more randomly generated letters;
a randomly generated password;
a randomly generated passphrase;
data associated with the owner of the virtual asset;
personal data associated with the owner of an account associated with the virtual asset;
creation/launch restrictions associated with the virtual asset;
a token; and
any combination thereof.

31. The system for validating a virtual asset of claim 27 wherein processing and analyzing the primary virtual asset data from the virtual asset creation template and the primary virtual asset data from the virtual asset, and/or one or more sources associated with the virtual asset, to determine if the primary virtual asset data from the two sources match, or have a defined threshold level of similarity, and processing and analyzing the secondary authentication data from the virtual asset creation template and the secondary authentication data from the virtual asset to determine if the secondary authentication data from the two sources match, or have a defined threshold level of similarity, includes:
- hashing the primary virtual asset data and the secondary authentication data from the virtual asset creation template to generate a first hash value;
- hashing the primary virtual asset data from the virtual asset, and/or one or more sources associated with the virtual asset, and the secondary authentication data from the virtual asset to generate a second hash value;
- and comparing the first hash value with the second hash value to determine if the first hash value and the second hash value match, or have a defined threshold level of similarity.

32. The system for validating a virtual asset of claim 27 further comprising:
- providing the validated virtual asset with sensitive data.

33. The system for validating a virtual asset of claim 32 wherein the sensitive data includes data representing one or more secrets required by the virtual asset to boot up.

34. The system for validating a virtual asset of claim 33 wherein the one or more secrets are selected from the group of secrets consisting of:
- boot up data;
- usernames;
- passwords;
- passphrases;
- encryption keys;
- digital certificates;
- multifactor authentication data;
- account numbers;
- identification numbers; and
- any combination thereof.

* * * * *